United States Patent
Estevo et al.

(10) Patent No.: US 10,376,978 B2
(45) Date of Patent: Aug. 13, 2019

(54) ERGONOMIC HANDLE

(71) Applicant: The Boeing Company, Chicago, IL (US)

(72) Inventors: Curtis R. Estevo, Mesa, AZ (US); Stephen W. Bowman, San Tan Valley, AZ (US)

(73) Assignee: The Boeing Company, Chicago, IL (US)

( * ) Notice: Subject to any disclaimer, the term of this patent is extended or adjusted under 35 U.S.C. 154(b) by 741 days.

(21) Appl. No.: 14/941,078

(22) Filed: Nov. 13, 2015

(65) Prior Publication Data
US 2017/0136565 A1  May 18, 2017

(51) Int. Cl.
| | | |
|---|---|---|
| *B23K 37/00* | (2006.01) | |
| *B23K 3/03* | (2006.01) | |
| *B25G 1/10* | (2006.01) | |
| *B25G 3/12* | (2006.01) | |

(52) U.S. Cl.
CPC ............ *B23K 3/0346* (2013.01); *B25G 1/102* (2013.01); *B25G 3/12* (2013.01)

(58) Field of Classification Search
CPC .. B23K 3/00–3/0638; B25G 3/00–3/38; B25G 1/00–1/125; A01B 1/22; A01D 1/14
USPC ....................................................... 228/51–55
See application file for complete search history.

(56) References Cited

U.S. PATENT DOCUMENTS

| | | | | |
|---|---|---|---|---|
| 1,442,174 | A * | 1/1923 | Oberjohann | B25G 1/005 81/177.6 |
| 1,514,549 | A * | 11/1924 | Archibald Llano | B23K 3/02 219/162 |
| 1,519,246 | A * | 12/1924 | Forshee | B23K 3/0353 219/227 |
| 1,596,432 | A * | 8/1926 | Henson | B23K 3/0615 219/230 |
| 1,993,781 | A * | 3/1935 | Hampton | B23K 3/0338 200/61.85 |
| 2,054,506 | A * | 9/1936 | Leitsch | B23K 3/0615 219/230 |
| 2,094,432 | A * | 9/1937 | Pazzano | B25G 1/005 15/236.08 |
| 2,159,041 | A * | 5/1939 | Moulthrop | B23K 3/0361 219/230 |

(Continued)

FOREIGN PATENT DOCUMENTS

| | | | | |
|---|---|---|---|---|
| DE | 202011001183 U1 * | 6/2011 | ............. | A47B 95/00 |
| GB | 488737 A * | 7/1938 | ............. | B62K 21/12 |

(Continued)

*Primary Examiner* — Kiley S Stoner
(74) *Attorney, Agent, or Firm* — McDonnell Boehnen Hulbert & Berghoff LLP

(57) ABSTRACT

Methods and Apparatuses related to an ergonomic handle are disclosed. An example apparatus for supporting an elongate tool having a barrel may include an ergonomic handle housing. At least a portion of an exterior profile of the ergonomic handle housing includes one or more depressions spatially arranged in series along the portion of the exterior profile of the ergonomic handle housing. The apparatus may also include an attachment device coupled to the ergonomic handle housing and configured to couple the barrel of the elongate tool to the ergonomic handle housing.

11 Claims, 3 Drawing Sheets

(56) References Cited

U.S. PATENT DOCUMENTS

| | | | | | |
|---|---|---|---|---|---|
| 2,173,380 | A | * | 9/1939 | Tharp | B23K 3/0615 219/230 |
| 2,187,806 | A | * | 1/1940 | Moulthrop | B23K 3/0361 219/230 |
| 2,219,649 | A | * | 10/1940 | Hayes | B23K 3/0361 219/230 |
| 2,416,370 | A | * | 2/1947 | Barstad | B23K 3/0615 219/230 |
| 2,459,371 | A | * | 1/1949 | Foster | B23K 3/0361 126/236 |
| 2,572,444 | A | * | 10/1951 | Carden | B25G 1/005 74/527 |
| 2,658,983 | A | * | 11/1953 | Talbot | B23K 3/0353 16/422 |
| 2,691,908 | A | * | 10/1954 | Lamberth | B25D 3/00 403/235 |
| 3,248,034 | A | * | 4/1966 | McNutt | B23K 3/03 219/238 |
| 3,264,449 | A | * | 8/1966 | Brenner | B23K 3/03 219/227 |
| 3,561,510 | A | * | 2/1971 | Johnson | B25G 1/005 81/177.5 |
| 4,007,651 | A | * | 2/1977 | Scott | B25B 23/00 81/175 |
| 5,054,830 | A | * | 10/1991 | Nisenbaum | B25G 1/00 16/426 |
| 5,065,475 | A | * | 11/1991 | Watt | A01B 1/22 15/145 |
| 5,422,457 | A | * | 6/1995 | Tang | B23K 3/0315 219/227 |
| 5,440,784 | A | * | 8/1995 | Hull | A01K 87/08 16/114.1 |
| 5,445,424 | A | * | 8/1995 | Binette | B25C 11/00 294/102.1 |
| 5,499,852 | A | * | 3/1996 | Seigendall | A01B 1/026 294/54.5 |
| 5,524,809 | A | * | 6/1996 | Kosslow | B23K 3/0369 219/230 |
| 5,594,975 | A | * | 1/1997 | Christen | A47L 13/52 15/257.7 |
| 5,695,231 | A | * | 12/1997 | Hoffman | A01B 1/026 16/426 |
| 6,831,252 | B1 | * | 12/2004 | Crookshanks | B23K 3/0369 219/229 |
| 7,069,823 | B1 | * | 7/2006 | Howell | B25B 15/02 81/177.1 |
| 7,442,271 | B2 | * | 10/2008 | Asmussen | B23K 26/0096 118/723 ME |
| 9,775,272 | B1 | * | 10/2017 | Gilbert | B25G 1/06 |
| 9,878,436 | B1 | * | 1/2018 | Castro | B25G 3/18 |
| 9,918,429 | B1 | * | 3/2018 | Di Lallo | A01D 34/902 |
| 2003/0051315 | A1 | * | 3/2003 | Lau | A01B 1/026 16/426 |
| 2003/0146264 | A1 | * | 8/2003 | Miyazaki | B23K 3/027 228/51 |
| 2003/0168493 | A1 | * | 9/2003 | Hirano | B23K 3/022 228/51 |
| 2004/0007887 | A1 | * | 1/2004 | Elliott | A01B 1/00 294/58 |
| 2005/0097663 | A1 | * | 5/2005 | Mercado | B25G 1/06 4/255.11 |
| 2005/0218197 | A1 | * | 10/2005 | Mochizuki | B23K 1/018 228/264 |
| 2008/0040892 | A1 | * | 2/2008 | Jenkins | B25G 1/06 16/426 |
| 2008/0196205 | A1 | * | 8/2008 | Hixon | A01B 1/026 16/426 |
| 2010/0037424 | A1 | * | 2/2010 | Swerdlick | A47L 9/325 15/410 |
| 2012/0318313 | A1 | * | 12/2012 | Dickerson, II | A61H 3/02 135/72 |
| 2014/0196921 | A1 | * | 7/2014 | Kondo | B25F 5/02 173/46 |
| 2014/0304949 | A1 | * | 10/2014 | Denton | B25G 1/102 16/430 |
| 2014/0352114 | A1 | * | 12/2014 | Yoshikane | B25F 5/02 16/426 |
| 2015/0033543 | A1 | * | 2/2015 | Markwardt | B25B 5/10 29/559 |
| 2015/0083452 | A1 | * | 3/2015 | Rader | A01D 34/902 173/170 |
| 2017/0106508 | A1 | * | 4/2017 | Chang | B25B 23/0021 |
| 2017/0106525 | A1 | * | 4/2017 | Brauer | B25F 5/026 |
| 2017/0347517 | A1 | * | 12/2017 | Ahearn | A01B 1/022 |

FOREIGN PATENT DOCUMENTS

| | | | | |
|---|---|---|---|---|
| GB | 1258086 | A | * 12/1971 | B23K 3/0615 |
| GB | 2462279 | A | * 2/2010 | B25G 1/005 |
| WO | WO-2007009075 | A2 | * 1/2007 | A01B 1/00 |
| WO | WO-2009136150 | A1 | * 11/2009 | B25G 1/04 |

* cited by examiner

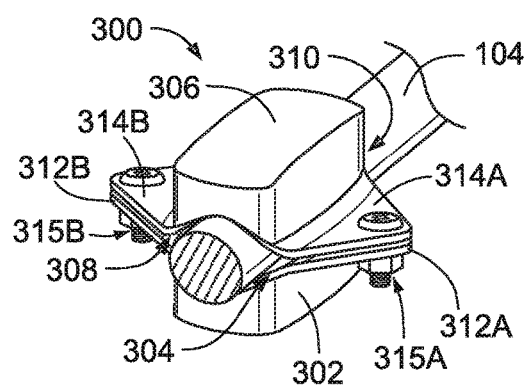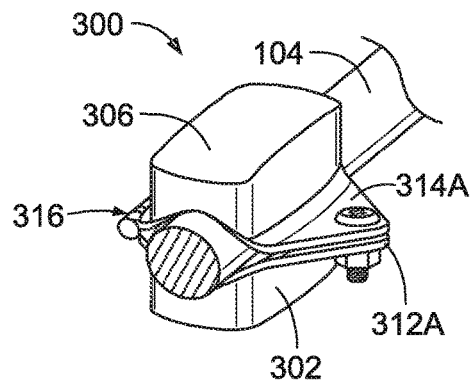
FIGURE 3A                FIGURE 3B
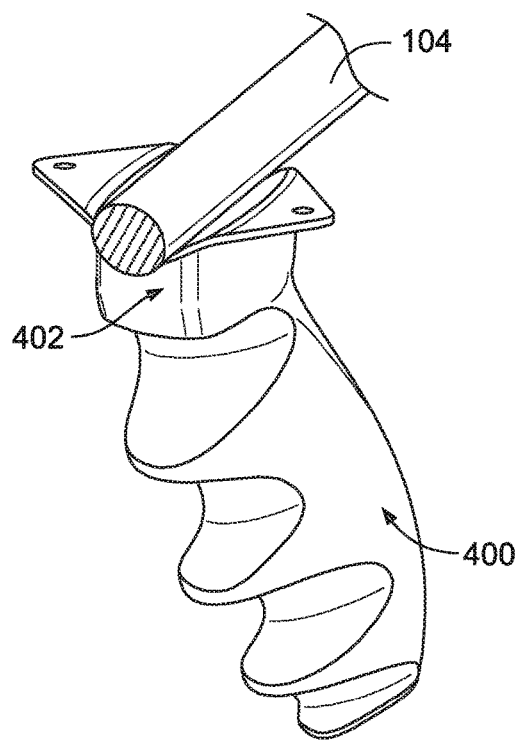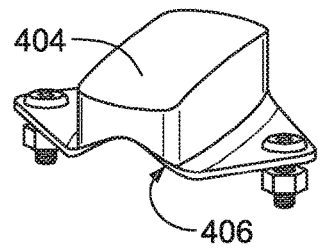
FIGURE 4A                FIGURE 4B

ERGONOMIC HANDLE

FIELD

The present disclosure relates generally to an ergonomic handle that facilitates handling elongate tools.

BACKGROUND

Tools are used in manufacturing and laboratory environments to perform a variety of tasks. As an example, soldering irons may be used to perform soldering tasks related to electronic boards, which might require precision work. To perform such precision work, a soldering iron that has a heated soldering tip attached to a separate pen style handle may be used. A user would hold the handle in his hand, with fingers pinching the handle to perform any soldering tasks.

SUMMARY

The present disclosure describes embodiments that relate to apparatuses and methods associated with an ergonomic handle. In one aspect, the present disclosure describes an apparatus for supporting an elongate tool having a barrel. The apparatus includes an ergonomic handle housing. At least a portion of an exterior profile of the ergonomic handle housing includes one or more depressions spatially arranged in series along the portion of the exterior profile of the ergonomic handle housing. The apparatus also includes an attachment device coupled to the ergonomic handle housing and configured to couple the barrel of the elongate tool to the ergonomic handle housing.

In another aspect, the present disclosure describes a method. The method includes disposing one or more depressions along an exterior profile of an ergonomic handle housing. The method also includes securing an attachment device to the ergonomic handle housing. The method further includes enclosing a barrel of an elongate tool using the attachment device so as to couple the elongate tool to the ergonomic handle housing.

In still another aspect, the present disclosure describes an apparatus for supporting an elongate tool having a barrel. The apparatus includes an ergonomic handle housing. At least a portion of an exterior profile of the ergonomic handle housing comprises one or more depressions spatially arranged in series along the portion of the exterior profile of the ergonomic handle housing. An end of the ergonomic handle housing is concaved. The apparatus also includes an attachment device configured to be coupled to the concaved end of the ergonomic handle housing. The attachment device has a concave portion corresponding to the concaved end of the ergonomic handle housing. The attachment device is configured to secure the barrel to the ergonomic handle housing.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3A illustrates an example barrel-enclosing component, in accordance with an example implementation.

FIG. 3B illustrates an element of a barrel-enclosing component rotatably connected to another element of the barrel-enclosing component, in accordance with an example implementation.

FIG. 4A illustrates an ergonomic handle housing having a concaved end, in accordance with an example implementation.

FIG. 4B illustrates an example attachment device, in accordance with an example implementation.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Elongate tools, such as soldering and welding irons, are used in manufacturing and lab environment to perform precision work. An elongate tool may have a tip attached to a barrel. For instance, a user may use a soldering iron to solder electronic components and wires to an electronics board. Such a soldering iron may have a heated soldering tip attached to a separate pen-style handle.

To perform precision work, a user would hold the handle or barrel in his hand, with fingers pinching on the barrel to perform particular tasks. To perform some tasks, the user may apply high pinch forces on the barrel for several hours. This may lead to discomfort or cramps similar to writer's cramp. Thus, it is desirable to have a handle with a comfortable, ergonomically designed grip. One end of the handle may have a clamp for attaching the handle to the barrel of the elongate tool. Such a handle may be used with existing elongate tools and may accommodate different sizes and types of tools.

In the description below, a soldering iron is used an example. However, the apparatuses and methods described herein could be used with any type of elongate tools.

II. EXAMPLE APPARATUSES

Figure 1:
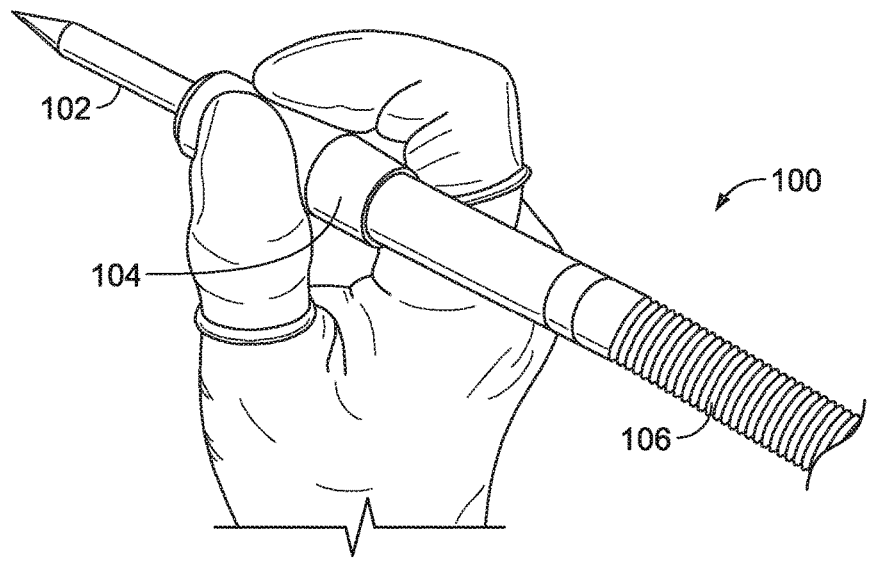
FIG. 1 illustrates an example elongate tool having a barrel, in accordance with an example implementation.

FIG. 1 illustrates an example elongate tool having a barrel, in accordance with an example implementation. Particularly, FIG. 1 illustrates a soldering iron 100 having a heated tip (a soldering probe) 102 attached to a barrel 104.

The barrel 104 is insulated to allow a user to hold the barrel 104 while operating the soldering iron 100. A cable 106 provides the soldering iron 100 with electric power to heat the tip 102. Users may hold the barrel 104 with their fingers to perform particular soldering tasks as shown in FIG. 1.

Figure 2:
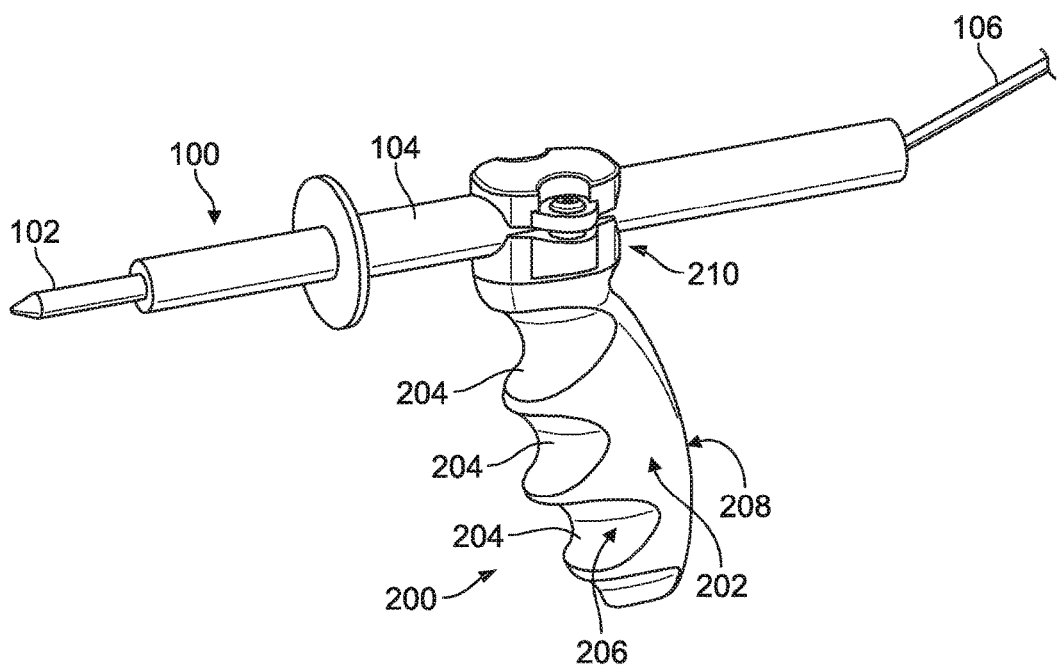
FIG. 2 illustrates an example ergonomic handle, in accordance with an example implementation.

FIG. 2 illustrates an example ergonomic handle 200, in accordance with an example implementation. The ergonomic handle 200 is shown in FIG. 2 coupled to the soldering iron 100 to provide a user with a comfortable ergonomic handle for operating the soldering iron 100.

The ergonomic handle 200 includes an ergonomic handle housing 202. At least a portion of an exterior profile of the ergonomic handle housing 202 has depressions 204. FIG. 2 illustrates three depressions 204 for illustration only. More or fewer depressions could be disposed on the ergonomic handle housing 202. In one example, one depression may be disposed on the ergonomic handle housing 202. The depressions 204 are spatially arranged in series along the portion of the exterior profile of the ergonomic handle housing 202. The depressions 204 may be configured to receive fingers of a user operating the soldering pen 100.

In examples, the ergonomic handle housing 202 may include a concave side 206 and a convex side 208. The depressions 204 are disposed on the concave side 206. The convex side 208 may be configured to receive a palm of the user, while the fingers are received in the depressions 204.

The ergonomic handle 200 also includes an attachment device 210. The attachment device 210 is coupled to the ergonomic handle housing 202. The attachment device 210 could be coupled to the ergonomic handle housing 202 by various techniques. For example, the attachment device 210 may be glued by an adhesive to the ergonomic handle housing 202. In another example, the attachment device 210 may be fastened to the ergonomic handle housing 202 by way of fasteners (e.g., screws) not shown in FIG. 2. In still another example, the attachment device 210 may be dovetailed with the ergonomic handle housing 202. Other coupling techniques could be used.

The attachment device 210 is configured to enclose the barrel 104 and thus couple or secure the barrel 104 to the ergonomic handle housing 202. The attachment device 210 may thus be a barrel-enclosing component attached to an end of the ergonomic handle housing 202. Example implementations of such a barrel-enclosing component are described next.

FIG. 3A illustrates an example barrel-enclosing component 300, in accordance with an example implementation. The barrel-enclosing component 300 is an example of the attachment device 210. The barrel-enclosing component 300 includes a first element 302. The first element 302 may be affixed (e.g., glued, fastened, dovetailed, etc.) to the end of the ergonomic handle housing 202 so as to couple the barrel-enclosing component 300 to the ergonomic handle housing 202. The first element 302 has a concave portion 304. The concave portion 304 matches a profile or cross section of the barrel 104. For instance, if the barrel 104 takes the shape of a cylinder having a particular radius, a radius of curvature of the concave portion 304 may match the particular radius of the barrel 104 so as to enable accommodating the barrel 104 in the concave portion 304.

The barrel-enclosing component 300 may also include a second element 306 having a respective concave portion 308 that corresponds to the concave portion 304. For example, a radius of curvature of the concave portion 308 may be the same or substantially the same as (e.g., within a threshold value such as a 5 mm from) the radius of curvature of the concave portion 304.

In this manner, when the second element 306 is coupled to the first element 302 as shown in FIG. 3A, the concave portion 304 of the first element 302 and the respective concave portion 308 of the second element 306 form a barrel-receiving bore 310 therebetween. The barrel-receiving bore 310 is configured to receive the barrel 104 of the soldering iron 100.

Several techniques could be used to couple the second element 306 to the first element 302. For example, as shown in FIG. 3A, the first element 302 may have flanges 312A and 312B on sides of the first element 302. The second element 306 may have corresponding flanges 314A and 314B on corresponding sides of the second element 306.

To couple the second element 306 to the first element 302, the flanges 312A and 312B may be positioned in a face to face arrangement with the corresponding flanges 314A and 314B. The flanges 312A and 312B may then be attached to the corresponding flanges 314A and 314B. For example, the flanges 312A and 312B may be glued to the corresponding flanges 314A and 314B. In another example, each of the flanges 312A, 312B, 314A, and 314B may have a respective hole. When the flanges 312A is positioned in a face to face arrangement with the corresponding flanges 314A, a hole of the flange 312A is aligned with a corresponding hole in the flange 314A. A bolt and nut 315A could then be used to couple the flange 312A to the flange 314A. Similarly, when the flanges 312B is positioned in a face to face arrangement with the corresponding flanges 314B, a hole of the flange 312B is aligned with a corresponding hole in the flange 314B. A bolt and nut 315B could then be used to couple the flange 312B to the flange 314B. Other fastening techniques could be used. Coupling the flanges 312A and 312B to the corresponding flanges 314A and 314B results in coupling the first element 302 to the second element 306.

Other configurations could be implemented to couple the second element 306 to the first element 302. FIG. 3B illustrates the second element rotatably connected to the first element 302, in accordance with an example implementation. As shown in FIG. 3B, the second element 306 may be rotatably connected, by way of a hinge 316, to one side to the first element 302 and may thus be configured to pivot relative to the first element 302. The second element 306 can pivot relative to the first element 302 between an open position and a closed position. In the open position, the barrel-enclosing component 300 is configured to receive the barrel 104 of the soldering pen 100. In other words, in the open position where the second element 306 is rotated away from the first element 302, the barrel 104 can be placed in the concave portion 304 of the first element 302 without interference from the second element 306. Thereafter, the second element can be rotated to the closed position to enclose the barrel 104.

As shown in FIG. 3B, on the unhinged side, the first element 302 has the flange 312A and the second element 306 has the corresponding flange 314A so as to enable coupling the first element 302 to the second element 306. Other coupling techniques could be used, however.

In FIGS. 2 and 3A-3B, the barrel-enclosing component 300, including the first element 302 and the second element 306, is a distinct component from the ergonomic handle housing 202. In such a modular implementation, attachment devices of different sizes can be coupled the ergonomic handle housing 202. Thus, if there are several elongate tools with barrels having different sizes, several attachment devices can be made with different bore sizes (different bores sizes of the barrel-receiving bore 310) to accommodate the different barrel sizes. Thus, if a particular elongate tool with a barrel of a particular size is to be used, an appropriate attachment device is selected an attached to the ergonomic handle housing 202 to couple the barrel to the ergonomic handle housing 202.

Similarly, different users may have different hand sizes or grip preferences. Thus, several user-specific ergonomic handle housings similar to the ergonomic handle housing 202 may be available to accommodate different preferences and hand sizes. Each user may select an appropriate ergonomic handle housing and couple it to an attachment device to use a particular elongate tool. In the example where only one depression is disposed on the ergonomic handle housing, the ergonomic handle housing may be less specific to a size of a user's hand.

In example implementations, the first element 302 may be an integral part of the ergonomic handle housing 202 as described next.

FIG. 4A illustrates an ergonomic handle housing 400 having a concaved end 402, in accordance with an example implementation. The ergonomic handle housing 400 can be described as a combination of the ergonomic handle housing 202 and the first element 302. In this implementation, the concaved end 402, which is similar to the first element 302, is not a separate component, but is an integral part of the ergonomic handle housing 400.

Further, in this implementation, the attachment device is similar to the second element 306, as opposed to the combination of the first element 302 and the second element 306. FIG. 4B illustrates an attachment device 404, in accordance with an example implementation. Similar to the second element 306, the attachment device 404 has a concave portion 406 that corresponds to the concaved end 402 of the ergonomic handle housing 400. The attachment device in this case may be coupled to the concaved end 402 in ways similar to how the second element 306 could be coupled to the first element 302 as described above with respect to FIGS. 3A-3B.

In the implementations shown in FIGS. 2, 3A-3B, and 4A-4B, when the barrel of the elongate tool is coupled to the ergonomic handle housing by way of the attachment device, the barrel is cantilevered on both sides of the attachment device. Length of cantilevered portion may be adjusted by sliding the barrel back and forth within the attachment device. When a desired length of cantilever is reached, the barrel is locked in place. As an example, the barrel 104 can be locked in place within the attachment device 300 by tightening nuts and bolts that couple the second element 306 to the first element 302.

The attachment devices shown in FIGS. 2, 3A-3B, and 4B are example implementation for illustration. Other attachment techniques could be used. For example, a zipper or a hose clamp could be used as an attachment device to couple the barrel 104 to the ergonomic handle housing 202.

An ergonomic handle housing, such as any of the ergonomic handle housings described above, could be made using different manufacturing techniques. For instance, the ergonomic handle housing could be made using an additive manufacturing technique, such as three-dimensional (3D) printing. In an example, injection molding could be used. In another example, the ergonomic handle housing could be used using machining techniques. Other manufacturing methods are contemplated.

An ergonomic handle housing, such as any of the ergonomic handle housings described above, could be made of different types of material based on an environment in which the housings would be used. For instance, if the ergonomic handle housing is used with a soldering pen, it could be made of a non-conductive material. As an example, the ergonomic handle housing could be made of composite material or wood, which is non-conductive, cheap, and light-weight.

Material types could also be determined based on manufacturing techniques used to make the components. For instance, a material of a specific type may be used if the components are made using an additive manufacturing technique, such as 3D printing, as opposed to machining or other manufacturing techniques.

As an example for illustration, the ergonomic handle housing could be made from nylon 11 laser sintering material, FR 106. In another example, ABS-M30, which is a production-grade thermoplastic material suitable for 3D printing, could be used. In still another example, ULTEM 9085, which is another thermoplastic material, could be used. These materials are examples for illustration only, and other materials are contemplated herein. In some examples, the attachment device may be made of the same material as the ergonomic handle housing. In other examples, the attachment device may be made of a different material from the ergonomic handle housing.

III. EXAMPLE METHODS

Figure 5:
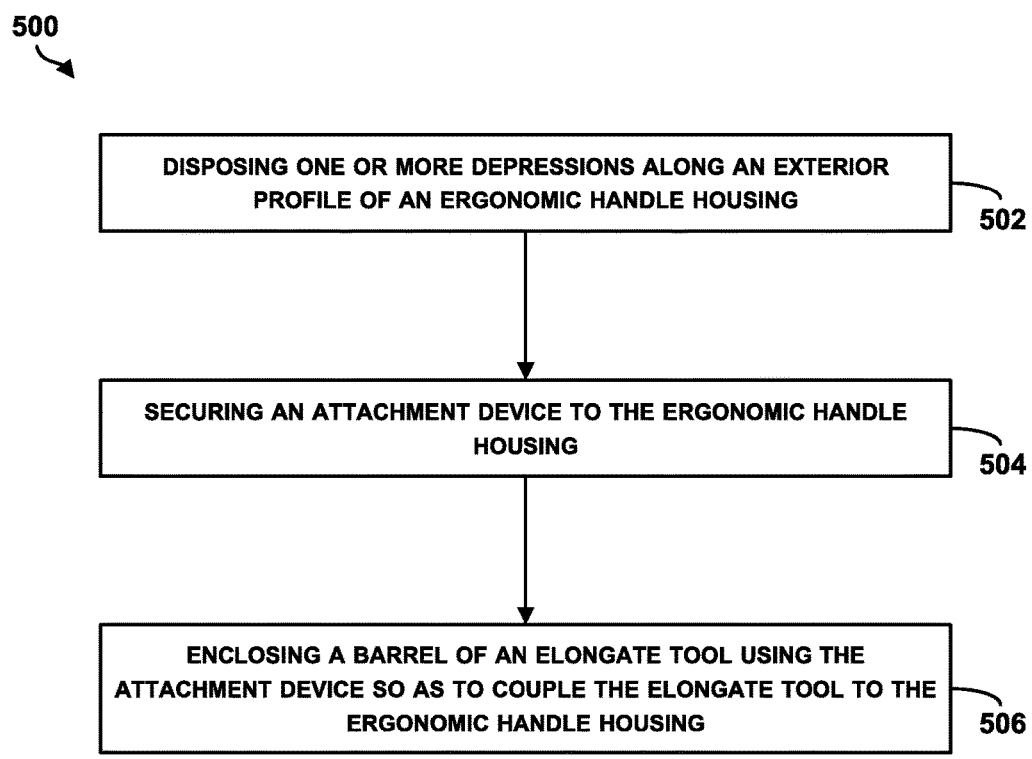
FIG. 5 is a flow chart of a method for use of an ergonomic handle, in accordance with an example implementation.

FIG. 5 is a flow chart of a method 500 for use of an ergonomic handle, in accordance with an example implementation. The method 500 may include one or more operations or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes disposing one or more depressions along an exterior profile of an ergonomic handle housing. This step may include any action to make the components available for use, such as bringing the components to an apparatus or to a work environment for further processing of the components (e.g., assembly, affixing other components, use, etc.).

In line with the discussion above, an ergonomic handle housing (e.g., the ergonomic handle housing 202) could be manufactured or formed such that one more depressions are disposed along an exterior profile of the ergonomic handle housing. This step of the method may include spatially arranging the one or more depressions in series along at least a portion of the exterior profile of the ergonomic handle housing. These depressions may be configured to receive fingers of a user. The ergonomic handle housing could be made of several types of materials. For example, the ergonomic handle housing could be made of a non-conductive material. In some examples, the ergonomic handle housing may be configured to include a concave side and a convex side. The one or more depressions may be disposed on the concave side, while the convex side may be configured to accommodate or receive a palm of a user.

At block 504, the method 500 includes securing an attachment device to the ergonomic handle housing. An attachment device (e.g., the attachment device 210 or any other attachment device described above) may be secured or coupled to the ergonomic handle housing. For example, the attachment device may be glued, fastened, or dovetailed to an end of the ergonomic handle housing.

At block 506, the method 500 includes enclosing a barrel of an elongate tool using the attachment device so as to couple the elongate tool to the ergonomic handle housing. The elongate tool could, for example, include a soldering pen, and the barrel could be an insulated barrel of the soldering pen.

In an example, the attachment device secured to the ergonomic handle housing may be a barrel-enclosing component (e.g., the barrel-enclosing component 300). The barrel-enclosing component may include a first element affixed to an end of the ergonomic handle housing. The first element may have a concave portion. The barrel-enclosing component may also include a second element having a respective concave portion. When the second element is coupled to the first element, the concave portion of the first element and the respective concave portion of the second element form a barrel-receiving bore therebetween.

In the example where the attachment device is the barrel-enclosing component having the first element and second element described above, the barrel of the elongate tool may be positioned in the concave portion of the first element. Then, to enclose the barrel within the attachment device, the second element is coupled to the first element to secure the barrel therebetween.

The second element could be coupled to the first element by several techniques as described above with respect to FIGS. 3A-3B. For example, the second element may be rotatably connected to the first element and may thus be configured to pivot relative to the first element between an open position and a closed position. In this case, positioning the barrel in the concave portion of the first element may include positioning the second element in the open position to enable positioning the barrel in the concave portion of the first element without interference from the second element. Then, the second element is positioned in the closed position (i.e., rotating the second element to the closed position) to enclose the barrel between the second element and the first element. The second element is then coupled to the first element to secure the barrel therebetween.

In a particular example, the first element may have a flange on a side of the first element and the second element has a corresponding flange on a corresponding side of the second element. In this example, coupling the second element to the first element includes positioning the flange of the first element in a face to face arrangement with the corresponding flange of the second element. The flanges could then be glued together or a fastener could be used to couple the flanges.

In an example, as described in FIGS. 4A and 4B, the first element may be an integral part of the ergonomic handle housing. In other words, an end of the ergonomic handle housing may be concaved to operate as the first element, while the attachment device may be the second element.

In examples, the barrel is and enclosed by and secured within the attachment device such that the barrel is cantilevered on both sides of the attachment device. A length of the cantilevered portion on either side of the attachment device could be adjusted by sliding the barrel within the attachment device prior to securing the barrel to the attachment device.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
   a soldering pen having a tip attached to a barrel;
   an ergonomic handle housing, wherein at least a portion of an exterior profile of the ergonomic handle housing comprises one or more depressions spatially arranged in series along the portion of the exterior profile of the ergonomic handle housing; and
   an attachment device fixedly coupled to the ergonomic handle housing and configured to couple the barrel of the soldering pen to the ergonomic handle housing such that the barrel is non-rotatable relative to a longitudinal axis of the ergonomic handle housing, wherein the attachment device comprises (i) a first element affixed to an end of the ergonomic handle housing and having a concave portion, wherein the first element has a flange on a first side of the first element, and (ii) a second element having a corresponding flange on a corresponding first side of the second element, wherein the second element has a notch configured to accommodate a fastener to be disposed therethrough and through the corresponding flange of the second element and through the flange of the first element so as to couple the first element to the second element, wherein the second element has a respective concave portion such that when the second element is coupled to the first element, the concave portion of the first element and the respective concave portion of the second element form a barrel-receiving bore therebetween configured to accommodate the barrel of the soldering pen, wherein a radius of curvature of the concave portion of the first element and a respective radius of curvature of the respective concave portion of the second element are the same as a radius of the barrel.

2. The apparatus of claim 1, wherein the ergonomic handle housing comprises a concave side and a convex side, wherein the one or more depressions are disposed on the concave side.

3. The apparatus of claim 1, wherein:
   as the second element is coupled to the first element, the flange of the first element is positioned in a face to face arrangement with the corresponding flange of the second element, and
   the flange of the first element is coupled to the corresponding flange of the second element via the fastener disposed through the notch so as to couple the first element to the second element.

4. The apparatus of claim 3, wherein a second side of the first element and a corresponding second side of the second element are coupled to each other by way of a hinge, such that the second element is rotatably connected to the first element at the hinge and is configured to pivot about the hinge relative to the first element between an open position and a closed position, wherein:
   in the open position, the barrel of the soldering pen is received between the first element and the second element, and in the closed position, the flange of the first element is positioned in the face to face arrangement with the corresponding flange of the second element, thereby forming the barrel-receiving bore therebetween.

5. The apparatus of claim 1, wherein the first element is an integral part of the ergonomic handle housing.

6. The apparatus of claim 1, wherein when the barrel is coupled to the ergonomic handle housing, the barrel is cantilevered on both sides of the attachment device.

7. The apparatus of claim 1, wherein the ergonomic handle housing is made of a non-conductive material.

8. An apparatus comprising:
a soldering pen having a tip attached to a barrel;
an ergonomic handle housing, wherein at least a portion of an exterior profile of the ergonomic handle housing comprises one or more depressions spatially arranged in series along the portion of the exterior profile of the ergonomic handle housing, and wherein an integral end of the ergonomic handle housing is concaved to form a concaved end of the ergonomic handle housing; and
an attachment device configured to be coupled to the concaved end of the ergonomic handle housing, wherein the attachment device has a concave portion corresponding to the concaved end of the ergonomic handle housing, wherein the attachment device is configured to secure the barrel of the soldering pen to the ergonomic handle housing, wherein the concaved end of the ergonomic handle housing has a flange on a first side thereof, wherein the attachment device has a corresponding flange on a corresponding first side thereof, wherein the attachment device has a notch configured to accommodate a fastener to be disposed therethrough and through the corresponding flange of the attachment device and through the flange of the concaved end of the ergonomic handle housing so as to couple the attachment device to the concaved end of the ergonomic handle housing, wherein a second side of the concaved end of the ergonomic handle housing and a corresponding second side of the attachment device are coupled to each other by way of a hinge, such that the attachment device is rotatably connected to the ergonomic handle housing at the hinge and is configured to pivot about the hinge relative to the ergonomic handle housing between an open position and a closed position, wherein:
in the open position, the barrel of the soldering pen is received between the attachment device and the ergonomic handle housing, and
in the closed position, the flange of the concaved end of the ergonomic handle housing is positioned in a face to face arrangement with the corresponding flange of the attachment device, thereby forming a barrel-receiving bore therebetween configured to accommodate the barrel of the soldering pen.

9. The apparatus of claim 8, wherein a radius of curvature of the concave end of the ergonomic handle housing and a respective radius of curvature of the concave portion of the attachment device are the same as a radius of the barrel of the soldering pen.

10. The apparatus of claim 1, further comprising:
a cable entering through an end of the barrel and configured to provide electric power to the tip of the soldering pen.

11. The apparatus of claim 1, further comprising:
a disk disposed about an exterior surface of the barrel between the ergonomic handle housing.

* * * * *